United States Patent [19]

Lacey

[11] 4,307,636

[45] Dec. 29, 1981

[54] UNDERCUTTING TOOL

[75] Inventor: Patrick J. Lacey, Crestwood, N.Y.

[73] Assignee: Drillco Devices Limited, Long Island City, N.Y.

[21] Appl. No.: 136,021

[22] Filed: Mar. 31, 1980

[51] Int. Cl.[3] .............................................. B23B 29/034

[52] U.S. Cl. .......................................... 82/1.5; 408/159

[58] Field of Search .................... 82/1.5; 408/188, 180, 408/159; 145/124; 175/286, 284

[56] References Cited

U.S. PATENT DOCUMENTS

| | | | |
|---|---|---|---|
| 1,058,013 | 4/1913 | O'Brien | 175/286 |
| 3,008,360 | 11/1961 | Winberry | 408/159 |
| 3,854,839 | 12/1974 | Gottelt | 82/1.5 |

*Primary Examiner*—Leonidas Vlachos
*Attorney, Agent, or Firm*—Dowell & Dowell

[57] ABSTRACT

A rotary expansion tool for undercutting walls of a pre-existing cylindrical hole in which it is a snug fit, the tool having a hollow shaft with opposed longitudinal slots through its sides near its inner end; a push rod extending from a tool-drive coupling at the outer end of the shaft, non-rotatably into the shaft and terminating at a clevis near the opposed slots; the tool having cutter means attached by a pivot pin to the shaft and pivotable about the pin so that the cutter means can extend one of its longitudinal edges transversely outwardly through one slot to contact the walls of the hole, and can extend its opposite longitudinal edge into the other slot to stabilize the cutter; the clevis surrounding the cutter means and cooperating with diagonal slots therein to rotate the cutter means outwardly of the tool when the push rod is urged axially inwardly of the tool; and means for locating the position in the hole of the undercut with reference to the mouth of the hole.

1 Claim, 6 Drawing Figures

S
28
26
36
24
37
20
22
34
64
62
66
62
60
10
12
24
30
18
48
16
50
31
48
38
44
44
14

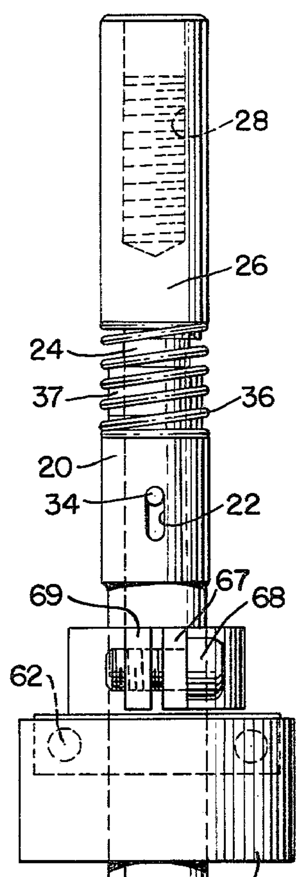
FIG. 1.
28
26
24
37
36
20
34
22
69
67
68
62
60
A
10
12
3
30
16
18
50
45
45
48
38
44
44
3
14
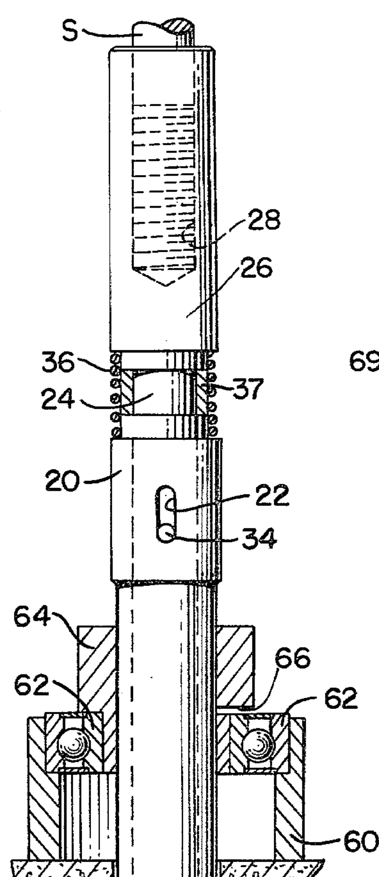
FIG. 2.
S
28
26
36
24
37
20
22
34
64
66
62
62
60
10
12
24
30
18
48
16
50
31
48
38
44
44
14
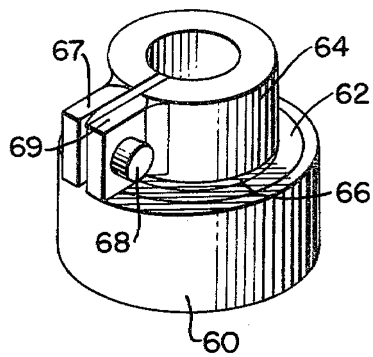
FIG. 4.
67
64
62
69
66
68
60
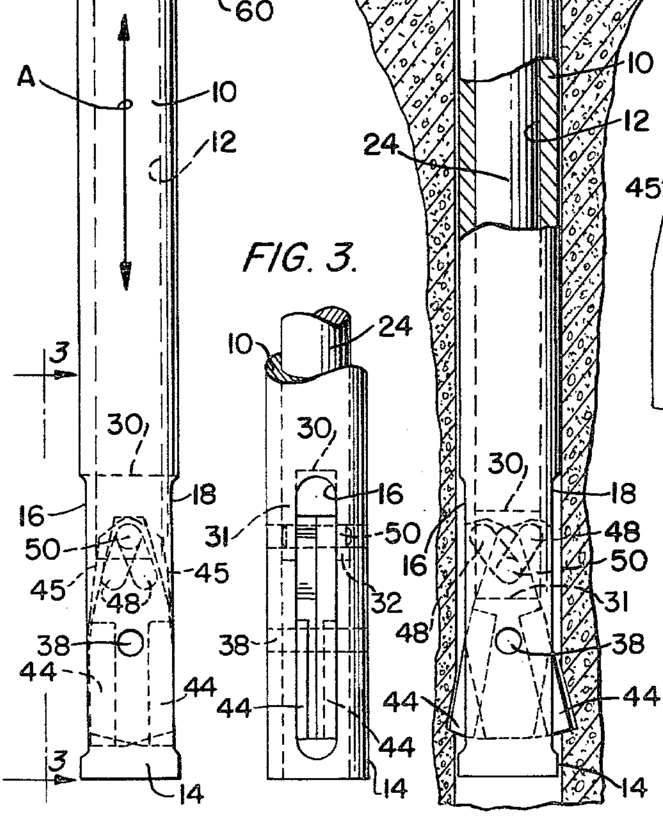
FIG. 3.
10
24
30
16
31
50
32
38
44
44
14
FIG. 5.
46
45
48
42
44
40
41
FIG. 6.
48
42
44
40

UNDERCUTTING TOOL

FIELD OF INVENTION

This invention relates to tools for undercutting the walls of a pre-existing hole at a location which is remote from the mouth of the hole but short of its other end.

BACKGROUND AND PRIOR ART

The present tool was developed for making a conical undercut in the walls of a pre-formed hole, which hole then receives an expanding anchor bolt which is designed to expand into and substantially fill the conical undercut. This structure is particularly useful in setting bolts into an existing concrete, stone, or other masonry structure where the hole is drilled after the structure is built, as distinguished from a wall having bolts embedded therein before the concrete sets. The undercutting of the hole greatly increases the reliability of the anchor bolt, as compared with an anchor bolt set into a hole having only cylindrical walls and relying on friction to prevent withdrawal of the bolt after it has been expanded.

The prior art shows many patents for tools used to undercut holes. For instance U.S. Pat. Nos. 2,225,165 to Dunlap and 2,401,515 to Schutte et al show underreamers having wide blades pivoted to the body of the tool and extensible therefrom when the tool is pushed into a hole so that a pin moves in a diagonal slot in each cutter.

U.S. Pat. Nos. 2,433,976 to Babka, 3,021,773 to Cogsdill and 3,025,729 to Heuser show similar tools in which the cutter elements are pivoted midway of their lengths so that the outer portion of the cutter rotates outwardly around the pivot when the inner portion is cammed oppositely. These patents also show live abutments adjustable to locate the undercutting at a desired distance inside the hole, and further show spring returns operative to retract the cutters when axial thrust is released from the tool by the operator.

Copies of the above five patents were filled with this application in lieu of a Prior Art Statement.

THE INVENTION

The tool which is the subject of this invention comprises a hollow cylindrical shaft which is longer than the preformed hole which the tool must undercut, the shaft having two longitudinally extending, diametrically opposed, guide slots spaced back from its inner end. One or two cutters are pivotally mounted inside the shaft so that each can rotate about the pivot and extend its cutting edge outwardly through one guide slot and extend its opposite edge into the opposite guide slot. A push rod is located in the bore of the hollow shaft and can slide longitudinally therein through a short distance which is determined by the length of a limit slot through the shaft. A pin transfixes the push rod and extends into the limit slot so as to make the shaft rotate whenever the push rod is rotated, the push rod having a tool-drive coupling at the outer end thereof which is remote from the cutters and extends from the shaft. The other end of the push rod is bifurcated to partially surround the cutters and has a clevis pin extending through it and through a diagonal slot in each cutter. The diagonal slots are oriented in the cutters such that when the push rod is pushed deeper into the shaft, the clevis pin forces the cutters to pivot so that their cutting edges extend transversely oppositely outwardly through the slots; and when the push rod is retracted by a return spring the cutters are withdrawn inside the periphery of the shaft. A ball bearing abutment is mounted on the shaft and adjustably fixed longitudinally thereof to determine the axial location in the hole where the undercut will be made.

It is the principle object of this invention to provide an undercutting tool having greater stability during cutting operations so that a more accurate cut can be obtained in very hard materials, for instance while undercutting a hole in a concrete wall. The present tool has a number of features designed to improve the stability of the tool during the undercutting operation. In the first place, the shaft of the tool is a snug fit in the hole and the shaft extends into the hole beyond the point where the undercutting is to take place, which provides a bearing surface beyond the cutter which tends to prevent wobble of the shaft in the hole while it is being rotated. In the second place, the applicant has provided dual cutter members in the preferred embodiment, which cutter members extend in transversely opposite directions through the guide slots in the shaft so that the drag of the tool during undercutting is symmetrically located with reference to the axis of the tool and of the hole in the wall. This latter feature is not per se unusual in the prior art. However, the present invention teaches an additional feature which is very important for purposes of achieving stability: namely, that each of the cutter members during cutting partially occupies both of the opposed slots of the shaft, extending thereinto in both transverse directions during cutting operations. Each cutter member is pivotally mounted in the shaft near its center, and therefore extends longitudinally for a substantial distance on both sides of the central pivot. Each cutter has a hardened carbide cutting edges on one side beyond the pivot and has a slotted portion located outwardly of the pivot and adjacent to a longitudinal stabilizing edge on the opposite side from the cutting edge, and the cutter extends into one of the opposed slots on both of its transverse sides, the carbide cutting edge extending outwardly through one slot and the stabilizing edge extending into but not through the diametrically opposed slot. Thus, each cutter member is supported on both longitudinal edges during the cutting operation as well as being supported by the clevis of the push rod near its slotted outer end. This feature contributes in a major way to the stability of the cutter itself during the cutting operation.

Another object of the invention is make a tool having a single cutter blade which still remains stable within the hollow shaft during rotation of the shaft for purposes of undercutting. This is achieved because both the cutting edge of the cutter member and also its opposite stabilizing edge are supported in the two opposed slots whenever the cutting tool has its carbide end extended for purposes of cutting.

Still another object of the invention is to provide a tool in which sufficient opening is provided at each of the guide slots so that cuttings from the cutters can escape from the undercut zone by passing into the guide slots and then passing outwardly of the shaft through the inner end of the tool beyond the cutters and into the portion of the pre-existing hole which is located beyond the undercut.

It is a further object of the invention to provide a push rod which is slidably and non-rotatably mounted within the bore of the hollow shaft, the push rod being bifurcated at its end adjacent to the cutters and the two bifurcated legs of the push rod extending on opposite sides of the cutter members with a snug sliding fit, thereby lending the cutter members greater support at their slotted ends.

A further object of the invention is to provide a structure for an undercutting tool as set forth above wherein the carbide cutting edge of each cutter member is located longitudinally on the opposite side of the pivot pin from the slotted end of the cutter member so that the largest quantity of cuttings from the walls of the hole will fall through the guide slots into the shaft at a point which is axially remote from the slotted portion of the cutters where the bifurcated push rod engages them, whereby the larger quantity of cuttings does not tend to fall into and bind the slotted engagement of the cutter members with the push rod clevis.

It is another object of the invention to provide an improved ball bearing abutment and clamping structure which can be positioned at any desired location along the hollow shaft to control the depth of the undercut with reference to the outer surface of the wall. One reason for requiring the greater stability which is built into the present undercutting tool is that the undercut is to be made deep within the pre-existing hole so that when an expansion bolt is expanded into the undercut, it will be secured in place by a large volume of concrete located between the undercut and the outer face of the concrete wall, whereby any failure of the expansion bolt will occur due to breaking of the bolt itself rather than due to fracturing of a conical zone of concrete located between the undercut and the outer face of the wall. Since the undercut must be made deep within the hole in the wall, the cutting tool must be made relatively long as compared with its diameter, and therefore must be designed to achieve unusually good positional stability within the hole to avoid eccentric rotation insofar as possible while the undercutting is occurring.

Other objects and advantages of the invention will become apparent during the following discussion of the drawings.

THE DRAWINGS

FIG. 1 is an elevation view of the tool according to the present invention;

FIG. 2 is a view similar to FIG. 1, but partly in cross section, and showing the moving parts of the tool in a different position with the cutters extended;

FIG. 3 is a partial view taken along line 3—3 of FIG. 1;

FIG. 4 is a perspective view of the adjustable abutment which is a part of the tool shown in FIG. 1;

FIG. 5 is a plan view of a cutter member according to the invention somewhat enlarged beyond the size shown in FIGS. 1 and 2; and FIG. 6 is an elevation view of the cutter member shown in FIG. 5.

PREFERRED EMBODIMENT

Referring now to the drawings, the illustrated preferred embodiment of the invention comprises an elongated hollow shaft 10 having a central bore 12 extending therethrough. The shaft has an inner end 14 which is intended to be extended deeply into a pre-drilled hole which is to be undercut, the hole being only slightly larger in diameter than the shaft, and the outer surface of the shaft being closely guided by the side walls of the pre-drilled hole, for instance in a concrete wall. Just short of the inner end 14 of the shaft, there are two diametrically opposed guide slots 16 and 18. The outer end of the shaft has an annular boss 20 which is part of the shaft and which has an elongated limit slot 22 extended through two diametrically opposed sides of the boss 20.

Within the bore 12 of the hollow shaft 10 is located a push rod 24 which can be seen best in elevation in FIGS. 2 and 3 where the shaft is shown cut away. The push rod 24 extends along the axis A of the tool all the way outwardly through the boss 20 at the outer end of the shaft 10 and terminates in an enlarged tool-drive coupling member 26 which is internally threaded at 28 to receive the spindle S of a motor (not shown) which supports the tool and rotates it. The inner end of the push rod 24 is bifurcated as at 30, thereby providing two extended leg portions 31 and 32 which form a clevis.

The push rod 24 is longitudinally slidable within the shaft 10 through a distance determined by the length of the limit slot 22, a limit pin 34 passing through the push rod 24 and extending through the slot 22 in the boss 20. At the outer end of the shaft 10 there is a compression spring 36 which extends in multiple convolutions around the push rod 24 and is compressed between the outer end of the boss 20 and the inner end of the coupling 26, the spring 36 normally urging the push rod outwardly of the shaft so that the pin 34 normally lies in the upper end of the limit slot 22 as shown in FIG. 1. A collar 37 surrounds the rod 24 and helps to keep the spring 36 centered, and also takes thrust from the pin 34 when the tool is pushed into the drilled hole.

At the inner end of the tool a cutter assembly is pivotally mounted to the shaft 10 by a pivot pin 38 which extends through the shaft 10 and pivotally supports one or more cutter members of the type shown in FIGS. 5 and 6. The cutter members shown in FIGS. 5 and 6 are labelled 40, and each includes a pivot hole 42 through which the pivot pin 38 pivotally supports them. Either one or two cutter members can be used according to the present invention as will be described hereinafter.

Each cutter comprises a cutting edge carrying a hardened cutting portion 44, and a slotted end portion 46 through which a diagonally elongated slot 48 extends, the slot being disposed across the cutter from a location nearer the pivot pin 38 and nearer the cutting edge 44 to a location away from the pivot pin and nearer the opposite edge 45 of the cutter number.

On the other side of the cutter from the first cutting edge 44 there is a second stabilizing edge 45 which will be described in greater detail hereinafter.

As can be seen in FIGS. 1, 2 and 3, the preferred embodiment of the invention includes two identical cutter members of the type shown in FIGS. 5 and 6, which are mutually inverted one with respect to the other, and both mounted on the same pivot pin 38. The slotted ends of the two cutters extend into the clevis 30 of the push rod 24 between the bifurcated leg portions 31 and 32 and are a snug fit therein, although not a binding fit. The clevis of the push rod 24 has a clevis pin 50 which extends through the leg portions 31 and 32 and passes through both slots 48 of the two cutters 40. Since the cutters are free to pivot about the pivot pin 38, there angular positions are determined by the longitudinal position of the clevis pin 50 along the axis A and in the two slots 48 of the cutters 40.

When the tool is in relaxed condition with the limit pin 34 at the top of the slot 22 as shown in FIG. 1, the cutters 40 are retracted so that their longitudinal edges are pulled inside of the slots 16 and 18 and do not extend therefrom. On the other hand, when the spindle S pushes the tool inwardly into the hole (downwardly as shown in FIG. 2) so that the limit pin 34 advances toward the bottom of the limit slot 22, the clevis pin 50 pushes downwardly in the two slots 48 as shown in FIG. 2, thereby rotating each of the cutter members 40 so that its hardened cutting edge 44 extends outwardly beyond the slot 16 or 18 and beyond the outer diameter of the shaft 10, whereby when the tool is rotated within the preformed hole, the cutter edges 44 undercut the hole. The preformed hole in the concrete wall always extends to an axial depth which is deeper than the length of the portion of the shaft 10 which will be extended into it, whereby the inner end of the shaft 14 beyond the cutter means 40 will be guided by the walls of the hole at a zone which is beyond the undercutting location. By looking at FIG. 2 it will be seen that the cutting edges 44 extend at a fairly shallow angle from the tool, namely 9 degrees in the particular embodiment of the tool currently being manufactured, and these cutting edges cut a conical enlargement of the hole short of its blind end.

When the axial inward thrust is released from the spindle S, the push rod 24 is retracted outwardly with respect to the shaft 10 by the spring 36, whereby the clevis pin 50 retracts toward the other ends of the slots 48, FIG. 1. As a result, the two cutting edges 44 are retracted inwardly again so that they lie entirely within the outer periphery of the shaft 10.

One of the principal uses of the present invention is to provide a small conical undercut deep in a hole in a concrete wall for the purpose of receiving an expansion bolt, for instance of the type shown U.S. Pat. No. 4,011,786, issued to Heinrich Liebig. This type of expansion bolt expands conically at its inner end when a screw is tightened to draw a cone toward the outer end of the bolt and spread a sleeve which has been slotted, all in a manner well-known per se. The present undercutting tool is used to make identical undercuts in many holes so that each can receive such an expansion bolt. Therefore the tool is provided in a manner well-known per se with an abutment assembly so that the undercut occurs at the same depth in each hole in which the tool is used. In the present illustrative embodiment the abutment assembly comprises an abutment sleeve 60 which is supported by a ball bearing assembly 62 on a clamping sleeve 64. This abutment assembly can be seen best in FIG. 4. The abutment sleeve 60 and part of the annulus of the clamping sleeve 64 longitudinally overlap each other and support the races of the ball bearing 62. Part of the diameter of the clamping sleeve 64 is slotted as at 66 so that a bolt 68 can be tightened to draw the lugs 67 and 69 closer together, thereby clamping the sleeve 64 on the outer surface of the hollow shaft 10 at whatever location is desired to determine the depth within the pre-formed hole at which the conical undercut will be made by the tool.

As stated in the objects of this invention, it is a principal object to provide a tool which has improved stability within the hole while it is undercutting a conical portion therein. Part of the stability is achieved by having the inner end 14 of the tool extend into the hole beyond the location where it is being undercut by the cutting edges 44 so as to reduce the tendency of the tool to wobble eccentrically within the hole during undercutting operations.

Another major feature of the present tool is that the stabilizing edge portion labelled 45 in FIG. 5 of each of the cutter members is located such that when the cutter members are extended from their retracted position as shown in FIG. 1 into the slots 16 and 18 toward their expanded position as shown in FIG. 2, the stabilizing edge portions 45 extend into the opposite slots 18 and 16, whereby each of the cutter members 40 is supported by a slot on both sides of the cutter from the pivot pin 38. That is to say, when the cutting edge 44 extends outwardly through a slot, then part of the cutter member in the vicinity of the reference character 41 in FIG. 5 also lies against the same slot or against the other cutter member which is supported by that slot. Moreover, the stabilizing edge 45 also extends into the opposite slot as shown in FIG. 2, and therefore the second edge 45 of each cutter is stabilized by the opposing slot of the hollow shaft 10 or by resting against the other cutter member which is supported by that slot. From FIG. 5 it can be seen that the stabilizing edge 45 is quite long as measured generally in the direction of the axis A, and therefore a great deal of support is given by the slots to stabilize the cutter members 40 when extended. In addition, the fact that the slotted ends 46 of both cutters extend with a sliding fit snuggly into the clevis 30 gives them additional stabilization.

An additional feature of the tool is that the bore 12 of the hollow shaft 10 extends completely through the inner end 14 of the shaft. This is an advantage because half of the area of each opposed guide slot area is open, since the slots are only half occupied by the cutter means when extended as shown in FIG. 2. This provides an escape route for the cuttings which can pass inside the tool bore and then pass outwardly through the inner end of the tool 14 to be deposited in the blind end of the hole which has been preformed in the concrete wall, the hole extending somewhat beyond the end 14 of the hollow shaft 12 and receiving the cuttings quite easily. The pre-formed hole need not, of course, have a closed blind end. Moreover, another advantage of the tool is that the diagonal slots 48 and the clevis pin 50 are located well to the other side of the pivot pin 38 from the cutting edges 44, whereby the cuttings do not tend to foul the clevis and diagonal slots since the cuttings occur further into the hole therefrom.

A spacer sleeve 37 can be provided around the push rod 24 and underneath the coil spring 36 so as to keep the spring centered about the push rod 24. The axial length of the sleeve 37 is selected to equal the length of the limit slot 22 and thereby help to limit the axial thrust of the rod 24 into the shaft so that the sleeve 37 takes excess thrust from the pin 34 which might occur due to rough handling of the tool and the drive motor assembly which is actuating it.

Another embodiment of the invention could be used wherein one of the cutter members 40 is eliminated, and the remaining cutter member is proportioned to have sufficient thickness to substantially fill the widths of the guide slots 16 and 18 on both sides of the hollow shaft 10 when the remaining cutter is extended. This structure would provide cutting on only one side of the shaft, which would tend to increase the eccentricity of rotation of the shaft in a pre-formed hole during undercutting, but it would still be a satisfactory and workable tool, although not as stable in the hole and therefore not likely to cut as true a conical annulus.

This invention is not to be limited to the exact embodiment shown in the drawings, for obviously changes may be made therein within the scope of the following claims.

I claim:

1. A rotary expansion tool for insertion deep into a pre-existing hole to undercut the walls of the hole at a location which is intermediate the ends of the tool and remote from the mouth of the hole, comprising:

(a) an elongated shaft having an axial bore, extending all the way therethrough, the shaft having an outer surface fitting snugly in the hole and having two longitudinal guide slots extending from the bore through the shaft on diametrically opposite sides of the shaft axis at said intermediate location, the outer surface of the shaft providing bearing areas contacting the walls of the hole on both sides of said location;

(b) cutter means including two identical elongated cutter members in the bore, the cutter members being pivotally supported intermediate their ends in back-to-back relationship by a pivot carried by the shaft, the cutter members each having a first longitudinal cutting edge on one side of the pivot pin and a second longitudinal stabilizing edge on the other side of the pivot pin and a portion of both of these edges being always contained within an associated one of the guide slots, the cutting edge of each cutter member being supported by the back of the other cutter member and occupying the same guide slot as the stabilizing edge of the other cutter member; and (c) elongated rod means reciprocably carried in the bore of the shaft and having means at its inner end operative to pivot the cutter members about the pivot pin when the rod is pushed toward the cutter members to extend the longitudinal cutting edge of each member through one of the guide slots beyond the outer surface of the shaft while extending a different portion of the longitudinal stabilizing edge of each member to occupy the diametrically opposite guide slot, and the rod having a tool drive coupling at its outer end.

* * * * *